United States Patent Office 3,770,681
Patented Nov. 6, 1973

3,770,681
FIBROUS POLYURETHANE DISPERSIONS BY CHAIN EXTENSION OF POLYCARBONATE BASED PREPOLYMER WITH AQUEOUS POLYAMINE
Harro Witt, Hackenbroich, Gerhard Troemel, Pesch, and Gerhard Berndt, Monheim, Germany, assignors to Bayer Aktiengesellschaft, Leverkusen, Germany
No Drawing. Filed July 14, 1971, Ser. No. 162,692
Claims priority, application Germany, July 18, 1970, P 20 35 730.6
Int. Cl. B32b 27/02; D21h 5/12
U.S. Cl. 260—29.2 TN                6 Claims

ABSTRACT OF THE DISCLOSURE

Aqueous suspensions or pastes of fibrous internally crosslinked particles are provided and a method for preparing them by reacting polyurethane or polyurethane urea prepolymers containing ionic groups, free NCO groups and from about 60% to about 90% by weight of hexane diol-1,6 polycarbonate segments having the structure

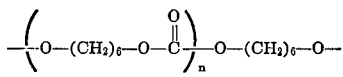

in which $n$ is an integer of from 5 to 20 with aqueous solutions of polyamines containing at least three primary and/or secondary amino groups. Textile substitutes can be made from these materials.

---

Various attempts have been made to produce substitutes for textiles or leather from suspensions of synthetic materials in papermaking machines.

It is known that synthetic staple fibres can be processed in papermaking machines. The materials thus obtained can be consolidated by means of resin-like binders or by fusion (cf. British patent specification No. 622,145 and United States patent specification No. 2,721,139). These products are very much like paper in character so that they are not suitable for use as substitutes for leather.

In addition, suspensions are known which can be processed on papermaking machines into sheet structures with the required textile-like properties (DAS No. 1,282,436 and German Offenlegungsschrift No. 1,469,120). These suspensions are prepared by a complicated process in which organic synthetic polymers are exposed to high shear forces in a suspending liquid.

On the other hand, aqueous, sedimenting dispersions of polyaddition products can be produced by a very simple process in which polyurethanes and/or polyureas containing ionic groups and free NCO groups are mixed with water in the presence of polyamines containing more than two primary and/or secondary amino groups (German patent specification No. 962). It is possible in this way to obtain internally crosslinked particles with a spherical or elongated form. Dispersions containing predominantly spherical particles are unsuitable for processing on papermaking machines.

Sheet structures produced by other processing techniques (for example by coating or casting on to substrates) also show particularly favourable properties where the particle geometry is as far way as possible from the spherical form. Another requirement which has to be met in order to obtain sheet structures, especially textile sheet structures, with good wear and tear properties is that the films or coatings should not harden with time. Thus, it has been possible to prepare dispersions with elongated particles and, from them, to prepare microporous films with initially outstanding properties which disappeared in a matter of weeks due to hardening. Dispersions of this kind can be obtained, for example, from ionic NCO prepolymers based on ethylene glycol/adipic acid polyesters.

It has now surprisingly been found that suspensions or pastes of predominantly fibrous particles can be obtained by reacting prepolymers based substantially on 1,6-hexane diol polycarbonates containing ionic groups and free NCO groups with aqueous solutions of polyamines containing at least three primary and secondary amino groups. The suspensions or pastes which can be obtained in this way make it possible to produce sheet structures which do not show any tendency towards hardening although 1,6-hexane diol polycarbonates have a fairly marked tendency towards crystallisation and have a higher melting range than ethylene glycol/adipic acid polyesters, for example. Another advantage of the suspensions or pastes obtainable according to the present invention lies in the fact that they are eminently suitable for the production of sheet structures on papermaking machines in particular.

It is therefore an object of the present invention to provide a process for the production of aqueous suspensions or pastes of fibrous internally crosslinked particles by reacting polyurethane or polyurethane/polyurea prepolymers containing both ionic groups and also free NCO groups with aqueous solutions of polyamines containing at least three primary and/or secondary amino groups, wherein the prepolymers containing both ionic groups and also free NCO groups used are those of the kind of which 60 to 90% by weight consist of 1,6-hexane diol polycarbonate units corresponding to the general formula:

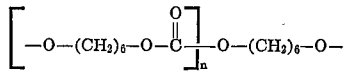

in which $n$ is an integer from 5 to 20.

It is a further object of the invention to provide aqueous suspensions or pastes of fibrous internally cross-linked particles prepared according to this process in which the fibrous particles have a length more than 100 times greater than their transverse diameter and not more than 20% by weight of the solids content is particles having a ratio of longitudinal diameter to transverse diameter of less than 2 or length of less than 10μ.

According to one particular embodiment of the process according to the invention, an adduct is initially prepared from:

(a) a relatively high moleecular weight dihydroxy compound containing 1,6-hexane diol carbonate groups;
(b) a compound which in addition to at least one NCO group or at least one hydrogen atom reactive to isocyanates also contains at least one salt-like group or at least one group capable of salt formation;
(c) optionally at least one other compound containing at least two hydrogen atoms reactive to isocyanates; and
(d) an excess of a polyisocyanate, based on the sum total of all the compounds which are reactive with isocyanates.

In the context of the invention, relatively high molecular weight dihydroxy compounds containing 1,6-hexane diol carbonate groups are preferably linear polycarbonates with molecular weights from 800 to 4000 obtained, for example, by reacting diphenyl carbonate with 1,6-hexane diol and optionally at least one other low molecular weight dihydroxy compound. The diol mixture used to synthesise mixed polycarbonates should consist of at least 80% by weight of 1,6-hexane diol. The other diols accounting for up to 20% by weight can be, for example, 1,5 - pentane diol, 1,8-octane diol, 1,12-dodecane diol, methyl- and dimethyl-1,5-pentane diol, methyl-, dimethyl- and trimethyl-1,6-hexane diol, 1,6-hexane diol-mono- and bis-2-hydroxide ethyl ether, 1,6-hexane diol mono- or bis- 5-hydroxide caproic acid ester, adipic acid-bis-6-hydroxyhexyl ester, diethylene glycol, tri- and tetraethylene glycol, oligomeric polyethers of 1,2-propane diol with molecular weights of up to 700, 1,4-bis-hydroxymethyl cyclohexane and hydroquinone-bis-2-hydroxy ethyl ether. The relatively high molecular weight dihydroxy compound containing 1,6-hexane diol carbonate groups is used in such a quantity to synthesise the adduct that the proportion by weight of these groups in the prepolymer containing ionic groups and NCO groups amounts to from 60 to 90%.

It is particularly preferred to use pure 1,6-hexane diol polycarbonates with molecular weights of from 1000 to 2500. In this case, the 1,6-hexane diol polycarbonate group content of the ionic NCO prepolymer preferably amounts to from 75 to 80% by weight.

Components (b), (c) and (d) are described in U.S. patent application No. 43,651, filed on Apr. 29, 1970, now abandoned.

To prepare the adduct, it is preferred to use a compound which contains two groups reacting with isocyanates and one salt-like group or one group capable of salt formation as the compound (b) which in addition to at least one NCO group or at least one hydrogen atom reactive to isocyanates also contains at least one salt-like group or at least one group capable of salt formation. The salt-like group can be either anionic or cationic in character. Examples of anionic extenders include compounds which in addition to at least two primary and/or secondary amino groups and/or two hydroxy groups also contain one sulphonate group or one carboxylate group. The compounds containing salt-like groups or the groups capable of salt formation are used in such quantities that the adducts contain from 0.01 to 1.5% by weight of cationic or anionic groups.

It is preferred to use a cationic extender which in addition to two hydroxy groups contains one tertiary amino group which is converted into the corresponding ammonium salt by alkylation. The following two amino diols are representative of the large group of these compounds:

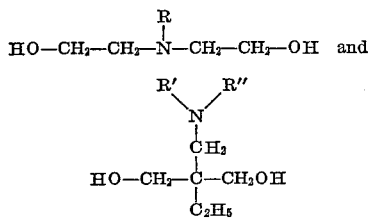

in which R, R' and R" represent alkyl radicals with 1 to 4 carbon atoms.

Further suitable cationic extenders are listed in U.S. patent application 43,651, filed on Apr. 29, 1970.

However, it is also possible initially to synthesise prepolymers containing non-ionic NCO groups, i.e. products which are only synthesised from the components (a), (d) and optionally (c) and then ionically to modify the prepolymers formed, for example, by the addition of carboxylic acid anhydrides, sultones, lactones, sulphur trioxide, sulphuric acid, amino epoxides, amino aziridines, bisulphite and similar compounds which are able to react with one of the reactive groups present in the prepolymer, for example the NCO group, the urethane or urea group, the aromatic nucleus of the diisocyanate or the olefinic double bond (for example by simultaneously using maleic acid anhydride, butene diol). The only factor of real significance so far as the process according to the invention is concerned is that the prepolymer should contain cationic or anionic groups. Of what type these groups are and how they are introduced does not really matter.

Any of the chain extenders commonly used in polyurethane chemistry may be employed as the compounds containing at least two hydrogen atoms reactive to isocyanates which are optionally used. Particular reference is made to diols of the kind already mentioned earlier on as starting components for the production of the polycarbonates, although ethylene glycol, 1,2- and 1,3-propylene glycol and 1,2-, 1,3- and 1,4-butane diol are also suitable. In addition, polyhydroxy compounds containing more than two hydroxy groups such as glycerol or trimethylol propane can also be added in small quantities. Aminoalcohols or diamines such as, for example, ethanolamine, ethylene diamine, 1,3-propylene diamine, etc. can also be used as chain extenders from the production of the prepolymers used in the process according to the invention.

Diisocyanates are preferably used as the polyisocyanates. By virtue of their greater stability to light, it is preferred to use aliphatic diisocyanates, for example tetramethylene diisocyanate, hexamethylene diisocyanate, octamethylene diisocyanate, xylylene diisocyanates, 2,2,4- and 2,4,4-trimethyl hexamethylene diisocyanate, 3-isocyanatomethyl-3,5,5-trimethyl cyclohexyl isocyanate, etc. Hexamethylene diisocyanate is preferably used as the diisocyanate, although it is also possible to use the usual aromatic isocyanates such as tolylene diisocyanates, diphenylmethane diisocyanates, optionally in combination with conventional light stabilisers. Further suitable polyisocyanates are listed in U.S. Patent 3,350,362.

The ionic NCO prepolymer is prepared by methods known per se: compnents (a), (b) and (c) can be reacted either simultaneously or successively with the polyisocyanate either in the melt or in a solvent. The solvents should preferably be inert with respect to isocyanates, although they can contain up to 2% by weight of water. The solvents should preferably be miscible with water and should have a boiling point of below 100° C. at normal pressure.

Suitable solvents are, e.g. acetone, methyl ethyl ketone, tetrahydro furane, dioxane etc. Solvents, which have a relatively slow reactivity towards NCO such as, e.g. isopropanol or tert.-butanol may also be used. Acetone the preferred solvent.

One particular embodiment of the process according to the invention is based on the use of prepolymers containing ionic groups and NCO groups in the preparation of which the excess of diisocyanate and the quantity of chain extenders containing two hydroxy groups and one tertiary amino group are selected so that the adduct contains from 1 to 4% by weight of free NCO groups, and, on completion of alkylation, from 0.02 to 0.2% by weight of quaternary ammonium nitrogen.

The ionic NCO prepolymer is dissolved in the solvent preferably in acetone in a concentration of from 30 to 60% by weight before dispersion. Solutions of this kind show viscosities of from about 30 to 300 cp. at 50° C. It is particularly preferred to process solutions with viscosities in the range from 50 to 200 cp.

These ionic NCO prepolymer solutions are mixed with aqueous solutions of polyamines containing more than two primary and/or secondary amino groups. The solvent may then be distilled off or removed by filtration of the polyurethane and redispersing the same in water, leaving an aqueous, sedimenting re-dispersible suspension. Polyamines containing aliphatic amino groups are preferred, in particular diethylene triamines, triethylene tetramines, tetraethylene pentamine and/or pentaethylene hexamines.

Mixing can be carried out by introducing the aqueous solution into the acetone solution or the acetone solution into the aqueous solution, with stirring. Mixing is preferably carried out continuously by delivering the two solutions into a mixing vessel by means of pumps. The mixing vessel in its most simple form is provided with a stirring mechanism and an overflow through which the aqueous-acetone dispersion flows into a distillation apparatus. The dispersion temperature is in a range from 20 to 60° C. and preferably in a range from 35 to 55° C. The quantity by weight of water in which the polyamine is dissolved required for dispersion amounts to from 0.8 to 3 times and preferably from 1 to 2 times the weight of the ionic NCO prepolymer. The ratio between the amino groups and the free NCO groups is from 0.2 to 1.5, and in the case of continuous dispersion at 35 to 55° C., preferably in the vicinity of the equivalence point.

The resulting aqueous, sedimenting, re-dispersible suspensions consist of internally crosslinked particles of predominantly fibrous structure. The geometry of the particles can be varied considerably as required through the chemical structure of the polyadduct, by the dispersion temperature, by the method and intensity of mixing and, more particularly, by the quantities of acetone and water used.

In contrast to conventional processes, dispersion does not involve the application of high shear forces, instead normal low speed stirrers are entirely adequate. In laboratory tests, the fibrous suspensions required are obtained simply by stirring manually with a glass rod.

It is possible in this way to obtain fibrous particles with a length which is more than 100 times greater than their transverse diameter, for example $5\mu$ thick and more than $500\mu$ long. Particles as extremely fibrous as these are not suitable for all applications. For example, they are easy to process but extremely difficult to knife-coat in paper-making machines. Particles with a transverse diameter of from about 5 to $10\mu$ and a longitudinal diameter of from about 15 to $150\mu$ are better suited to knife-coatable pastes. However, these suspensions as such can readily be processed in paper-making machines. The dimensions referred to above represent only approximate average values.

The suspensions obtainable by the process according to the invention can be used in a number of interesting fields. The production of microporous coatings or films is of particular interest. For this particular purpose, the proportion of finely divided material with a particle geometry which is very similar to the spherical form should be as small as possible. The proportion of a suspension consisting of particles less than $10\mu$ in longitudinal diameter or with a ratio of longitudinal diameter to transverse diameter of less than 2, should if possible not exceed 20% by weight of the solids content.

The suspensions are used in different dilutions, depending upon the particular processing technique. Suspensions with a solids content of from 10 to 60% are used for casting or knife-coating on to substrates, optionally following the addition of various auxiliaries, whilst a solid with a solids content of from 30 to 50% by weight is preferably used for doctor-kiss coating. The solids concentration is less than 10% and preferably less than 5% for processing in paper-making machines. Casting or knife-coating is carried out by conventional methods. Layers can be applied to water-impermeable or water-absorbing substrates, and then removed after solidification in the form of a self-supporting sheet structure. Microporous films prepared in this way can be bonded, for example, on to textiles, fleeces or skiver. On the other hand, these materials can also be directly coated with the suspensions. In both cases, it is often of advantage to add conventional thickeners to the suspension in order in particular to ensure adequate brushing properties.

On the other hand, sheet structures can be deposited from dilute aqueous suspensions on to screens. The Rapid-Kothen sheet former or papermaking machines, for example, are suitable for this purpose. The range of properties of the sheet structures can be varied by adding to them synthetic stable fibres and/or cellulose. It is also possible to use other additives such as wetting agents or dispersions of polymers, polycondensates or polyadducts, in particular of polyurethanes. The dispersions are coagulated in the suspension before deposition on to the screen. The sheet structure can be consolidated in different ways irrespective of the method by which it has been produced. In most cases, they are self-supporting after drying at room temperature. Their mechanical properties can be improved by the effect of temperature and/or pressure, although in most cases this also affects their permeability to water vapour. They are preferably sintered by a heat shock treatment, for example 3 minutes at 180° C. (U.S. patent application 95,960, filed on Feb. 7, 1970). The pressure treatment can be carried out with, optionally heated, calenders in which case embossed patterns can simultaneously be applied to the film.

Particular emphasis is placed upon pastes suitable for brush coating and knife-coating prepared from the sedimenting re-dispersible suspensions originally present by decantation, by the addition of thickeners such as alginates, soluble cellulose derivatives or hydrophilic oligo- or poly-urethane colloids. No further sedimentation occurs in these pastes after prolonged storage.

In order to obtain coatings with a limited permeability to water vapour but with outstanding mechanical properties, such as abrasion resistance and bending strength, and also with an outstanding stability to hydrolysis, these pastes may contain from 5 to 70%, and preferably from 5 to 40%, of stable polyurethane dispersions, preferably polyurethane ionomer dispersions with a particle size of from 0.2 to $2\mu$. The fact that cationic fibre suspensions can be combined with anionic stable dispersions and vice versa is of particular advantage.

Stable polyurethane dispersions are preferably added to the suspensions (pulps) intended for processing in paper-making machines for modification and also for improving initial strength in the wet state. To this end, cationic dispersions are preferably deposited on to staple fibres and anionic dispersions preferably deposited on to cationic polyurethane ionomer fibres.

Almost any required degree of permeability to water vapour can be obtained by varying the temperature, pressure and duration of the sintering operation. Extremely high tensile strengths and abrasion resistances are obtained where the permeability to water vapour is only very limited. More particularly, zones differing in their permeability to water vapour and in their strength can be adjusted on an initially isotropic material, as a result of which the material can be optimally adapted to the purpose for which it is to be subsequently used.

A combination of the following properties is of particular advantage in microporous coatings obtained with the dispersions according to the invention in contrast to conventional coatings, high strength; limited abrasion; no yellowing; high resistance to hydrolysis; high permeability to water vapour which can be reduced as required by after treatment, accompanied by an increase in strength; resistance to solvents; complete absence of organic solvents during coating.

Staple fibres based on polyamide, polyester, polyacrylonitrile and polyurethane elastomers, for example, are particularly suitable for use as the additives incorporated during processing in paper-making machines.

Before they are converted into sheet structures, the suspensions can also have crosslinking agents added to them (U.S. patent application 723,306, filed Apr. 22, 1968, now U.S. Patent No. 3,622,527). Examples of suitable crosslinking agents include masked isocyanates, formaldehyde or formaldehyde derivatives. By using crosslinking agents of this kind, it is possible for the suspension praticles to be crosslinked amongst one another in the films. The sheet structure can be coloured or pigmented and finished by conventional methods.

The sheet structures produced in accordance with the invention represent extremely valuable synthetic materials resembling leather or textiles in character. They can be used, for example, as a breathing clothing material, for example for weather-proof and rain-proof clothing, for the manufacture of shoes, in which case they are particularly suitable for use as a shoe upper leather and a soling material, for the production of upholstery materials, for example for car seats and easy chairs, for the production of belts and watch straps, solvent-resistant filter cloths, For these purposes it is possible to use both sheet structures produced solely from the dispersions according to the invention, optionally with additives in them, in papermaking machines, for example, and also sheet structures of the kind obtained by conventional techniques such as, for example, bonding, flame-laminating or coating substrates that are permeable to water vapour such as bonded webbing, textiles, skiver, with the dispersions according to the invention.

The following examples illustrate the preparation of the suspensions.

EXAMPLE 1

1000 g. of a 1,6-hexane diol polycarbonate with an OH number of 60.8 are stirred for 1 hour at 120° C. with 159 g. of hexamethylene-1,6-diisocyanate. The melt is left to cool to 60° C. and a solution of 8 g. of N-methyl diethanolamine in 236 g. of acetone is then added. Stirring is continued for another 2 hours at 60° C., after which the mixture is left standing overnight. It is then diluted with acetone at 50° C. to a prepolymer content of 41% by weight and at the same time quaternised with 8.3 g. of dimethyl sulphate. This solution has an NCO content of 0.89% and a viscosity of approximately 100 cp. at 50° C.

A metering pump simultaneously delivers 70 g. per minute of the ionic prepolymer solution at a temperature of 50° C. and 54.5 g. per minute of an aqueous solution of 0.532 g. of diethylene triamine heated to 60° C. into a vessel provided with an overflow in which a propeller stirrer rotates at 300 to 400 r.p.m. The volume up to the overflow amounts to some 400 ml. The temperature inside the dispersion vessel is between 40 and 45° C. The aqueous-acetone dispersion flows through the overflow into a distillation apparatus in which the acetone is distilled off with stirring at a bath temperature of 90° C., leaving an aqueous, sedimenting redispersible suspension of fibrous particles with transverse diameters of approximately $5\mu$ and longitudinal diameters of from 20 to $120\mu$, and in some cases up to $500~\mu$. The suspension is insoluble in hot dimethyl formamide.

EXAMPLE 2

The 41% prepolymer solution and the method by which it is dispersed are as described in Example 1. The prepolymer solution is again delivered at a rate of 70 g. per minute, but on this occasion an aqueous solution of 0.532 g. of diethylene triamine is delivered at a rate of 71.7 g. per minute. The particles of the suspension show an extremely pronounced fibre character with transverse diameters of less than $5\mu$ and lengths of a few hundred mu.

EXAMPLE 3

As in Example 1, 1000 g. of the hexane diol-1,6-polycarbonate used above are reacted with 173 g. of hexamethylene-1,6-diisocyanate and 8 g. of N-methyl diethanolamine, quaternised with 8.3 g. of dimethyl sulphate and diluted with acetone to a prepolymer content of 48.4%. This solution has an NCO value of 1.34% and a viscosity of approximately 110 cp. at 50° C. As in Example 1, 69.1 g. per minute of prepolymer solution are mixed with 56 g. per minute of an aqueous solution of 0.775 g. of diethylene triamine. Distillation of the acetone leaves a suspension of particles insoluble in dimethyl formamide approximately $5\mu$ thick and between 10 and $100\mu$ long, and in some cases up to $400\mu$ long. This suspension contains less than 5% by weight, based on its solids content, of relatively small spherical particles 5 to $10\mu$ in diameter which can be removed by washing out or by sifting.

EXAMPLE 4

As in Example 1, 1000 g. of 1,6-hexane diol polycarbonate (OH number 60.8) are reacted with 153 g. of 1,6-hexamethylene diisocyanate and 8 g. of N-methyl diethanolamine and diluted with acetone to a prepolymer content of 45%, accompanied by quaternisation with 8.3 g. of dimethyl sulphate. This solution has an NCO content of 0.87% and a viscosity of approximately 120 cp. at 50° C.

As in Example 1, 63.5 g. per minute of prepolymer solution are mixed with 33.2 g. per minute of an aqueous solution of 0.453 g. of diethylene triamine. An aqueous suspension of particles insoluble in dimethyl formamide with a transverse diameter of approximately $5\mu$ and a longitudinal diameter of from 10 to $300\mu$ is obtained.

EXAMPLE 5

As in Example 1, 1000 g. of a 1,6-hexane diol polycarbonate (OH number 37) are reacted with 121 g. of hexamethylene-1,6-diisocyanate and 7.7 g. of N-methyl diethanolamine, quaternised with 8 g. of dimethyl sulphate and diluted with acetone to a prepolymer content of 45%.

72 g. per minute of this solution are mixed with 45.3 g. per minute of an aqueous solution of 0.587 g. of diethylene triamine. The resulting aqueous suspension is similar to that prepared in Example 3.

EXAMPLE 6

1000 g. of a 1,6-hexane diol polycarbonate with an OH number of 52.8 are reacted as in Example 1 with 180 g. of 1,6-hexamethylene diisocyanate and 16 g. of N-methyl diethanolamine and quaternised with 16.6 g. of dimethyl sulphate. A 40% solution of this polymer in acetone has an NCO content of 1.16% and a viscosity of approximately 40 cp. at 50° C.

Dispersion is carried out as in Example 1 by mixing 74.0 g. per minute of the prepolymer solution with 41.4 g. per minute of an aqueous solution of 0.7 g. of diethylene triamine. The suspension corresponds substantially to that obtained in Example 3 except that the particles are slightly smaller.

EXAMPLE 7

29,380 g. of 1,6-hexane diol polycarbonate (OH number 52.8) to which 29.4 g. of 1,1,1-tris-[hydroxymethyl]-propane had been added, are stirred for 1 hour at 120° C. with 391 g. of hexamethylene diisocyanate. A solution of 231 g. of N-methyl diethanolamine in 6800 g. of acetone is then added at 60° C., followed by stirring for 5 hours at 60° C. The product is then quaternised with 240 g. of dimethyl sulphate and at the same time diluted with acetone to a prepolymer content of 39%. This solution has a viscosity of approximately 120 cp. at 50° C., for an NCO content of 0.58%. As in Example 1, 70.5 g. per minute of prepolymer solution are mixed with 38.5 g. per minute of an aqueous solution of 0.336 g. of diethylene triamine. The suspension which is insoluble in hot dimethyl formamide shows a relatively non-uniform particle pattern in addition to a very few (less than 3%) spherical particles, a small proportion of the particles (less than 20%) are in the form of small rods approximately $5\mu$ in diameter and 10 to $30\mu$ long. Most of the particles are in the form of fibres with lengths of up to $150\mu$ and in some cases up to $50\mu$.

EXAMPLES 8 TO 13

1000 g. batches of 1,6-hexane diol polycarbonate are stirred for 30 minutes at 100° C. with hexamethylene-1,6-diisocyanate (HDI). Various quantities of different low molecular weight diols are then introduced with stirring, and the temperature is maintained at 100° C. for another 30 minutes. The mixtures are then cooled to 60° C., followed by the dropwise addition of a solution of N-methyl diethanolamine (MDA) in 275 g. of acetone. This is followed by standing overnight. Table 1 sets out the quantities of the components and the OH number of the polycarbonate.

TABLE 1

| Number | OH No. | HDI, g. | Diol, g. | | MDA, g. |
|---|---|---|---|---|---|
| 8 | 57.8 | 175 | 1,4-butane diol | 10.2 | 8.2 |
| 9 | 57.8 | 186.5 | 1,6-hexane diol | 20.8 | 8.33 |
| 10 | 57.8 | 172 | Neopentyl glycol | 10.2 | 8.16 |
| 11 | 57.8 | 212 | ....do.... | 32.2 | 8.6 |
| 12 | 57.8 | 164 | 1,4-bis-(β-hydroxy-ethoxy)-benzene. | 10.1 | 8.1 |
| 13 | 52.8 | 198 | Octaethylene glycol | 100.0 | 8.0 |

Table 2 shows the prepolymer content (percent prep.) to which the product is diluted with acetone, with how much dimethyl sulphate it is quaternised (DMS) and the NCO contents (percent NCO) and viscosities (at 50° C.) which these solutions have. The solutions are mixed as in Example 1 with aqueous diethylene triamine solutions at 40 to 45° C. The last three columns indicate the quantities of prepolymer solution (prep.), aqueous amine solution (W) and diethylene triamine (DAET) delivered per minute.

TABLE 2

| No. | DMS, g. | Percent Prep. | Percent NCO | Vis., cp. | Prep., g. | W, g. | DAT, g. |
|---|---|---|---|---|---|---|---|
| 8 | 8.5 | 46.5 | 0.94 | 150 | 72.2 | 40.8 | 0.566 |
| 9 | 8.65 | 45.0 | 0.865 | 130 | 72.4 | 39.1 | 0.512 |
| 10 | 8.46 | 46.0 | 0.905 | 130 | 72.5 | 46.7 | 0.535 |
| 11 | 8.9 | 50.0 | 1.00 | 190 | 73.6 | 51.5 | 0.600 |
| 12 | 8.4 | 47.0 | 0.955 | 145 | 73.5 | 48.4 | 0.573 |
| 13 | 8.3 | 50.0 | 1.33 | 80 | 74.9 | 59.9 | 0.815 |

The suspensions obtained correspond substantially to those obtained in accordance with Example 7.

EXAMPLE 14

1000 g. of a polycarbonate with an OH number of 59.5, obtained by reacting the reaction product of 1,6-hexane diol with adipic acid (molar ratio 5:1) with diphenyl carbonate, are reacted as in Example 1 with 160 g. of hexamethylene-1,6-diisocyanate and 8 g. of N-methyl diethanolamine, followed by quaternisation with 8.3 g. of dimethyl sulphate. A 48% solution of the prepolymer in acetone has an NCO value of 1.12% and a viscosity of 200-cp. at 50° C.

As in Example 1, 73.5 g. per minute of prepolymer solution are mixed with 0.69 g. per minute of diethylene triamine. A suspension of fibrous particles that are insoluble in dimethyl formamide is formed.

EXAMPLE 15

A modified 1,6-hexane diol polycarbonate is prepared as follows by methods known per se (Belgian patent specification No. 731,926).

1,6-hexane diol is reacted with caprolactone in a molar ratio of 5:1 and the reaction product subsequently esterified with diphenyl carbonate, phenol being distilled off until an OH number of 112 is obtained. As in Examples 8 to 13, 1000 g. of this polycarbonate are reacted with 300 g. of hexamethylene-1,6-diisocyanate, 34.6 g. of neopentyl glycol and 9.2 g. of N-methyl diethanolamine. The prepolymer is quaternised with 9.5 g. of dimethyl sulphate and diluted with acetone to 45%. As in Example 1, 73.0 g. per minute of this prepolymer solution are mixed with 45.9 g. per minute of an aqueous solution of 0.477 g. of diethylene triamine. The suspension substantially corresponds to that obtained in accordance with Example 7.

The following examples illustrate the use of the suspensions.

EXAMPLE 16

100 g. of a 35% suspension according to Example 4 are admixed with 4 g. of a thickener of 2 g. of water, 1 g. of a polyurethane adduct of 2 mols of polyethylene glycol ether with a molecular weight of 6000, 1 mol of 2,4-tolylene diisocyanate and 2 mols of stearyl isocyanate, and 1 g. of a condensation product of benzyl chloride and hydroxy diphenyl with 12 mols of ethylene oxide (benzyl-p-hydroxy diphenyl polyglycol ether). A highly viscous washable paste is obtained by stirring, being coated on to bright-chromed sheets of metal in a layer thickness of 0.8 mm. by means of a suitable knife-coating machine. A 0.35 mm. thick porous film is obtained by drying this layer for 30 minutes in a drying cabinet (Heraeus LKTFU) with recirculating air at 80° C. After cooling to room temperature (25° C.), the film thus obtained can be detached from the metal plate without cracking. The measurement of tensile strength and breaking elongation in accordance with DIN 53 504 on standard test specimens 5.1 mm. wide produced the figures set out in the following below 80° C. The figures set out below in the 180° C. column were obtained by after-treatment for 5 minutes at 180° C.

| | 80° C. | 180° C. |
|---|---|---|
| Tensile strength, kp./cm.$^2$ | 80 | 114 |
| Breaking elongation, percent | 300 | 380 |

These figures were still the same after ageing for 6 days at 95% relative humidity at temperatures of 70° C.±2° C. The permeability of the film dried at 80° C. to water vapour amounted to 500 g./m.$^2$/day, and after heat treatment at 180° C. to 350 g./m.$^2$/day. Permeability to water vapour was measured in accordance with DIN 53 122 at a humidity differential of 85% relative humidity and at a testing temperature of 20° C.

EXAMPLE 17

A paste prepared in accordance with Example 16 from a suspension according to Example 3 and thickening agent is applied in a uniform layer thickness of 0.3 mm. to a bleached cotton nettle fabric weighing 80 g. per sq. metre by means of a suitable machine consisting of tenter frames and a knife-coating unit, and then dried for 8 minutes at 80° C. in a recirculating air drying cabinet. The coating thus obtained is porous and can be bent sharply without breaking. The total weight amounts to 180 g./cm.$^2$. The porous layer has a bond strength of 1 kp./cm. in a delamination test in which the separation speed is 10 cm./min. In a tearing test carried out in accordance with Example 16, the film separated from the textile was found to have a tensile strength of 40 kp./cm.$^2$. This figure was increased to 80 kp./cm.$^2$ by after-treatment for 3 minutes at 180° C. In the case of another coating similarly treated for 3 minutes at 180° C., the porous layer could no longer be satisfactorily separated because its adhesion to the textile was too great.

The coated fabric allows 620 g./m.$^2$/day of water vapour through it at 80% relative humidity difference and at 25° C., in accordance with DIN 53 379.

The coating can be bent 100,000 times without cracking (tested in accordance with DIN 53 359). The coating does not show any signs of an increase in hardness after storage for 4 weeks at room temperature. The coating is suitable for the production of a leather substitute which is permeable both to air and to water vapour.

EXAMPLE 18

A mixture of 50 g. of the thickener mentioned in Example 16 of polyurethane and ethoxylated condensation product and 5 g. of an ion oxide brown pigment is added to 1000 g. of a suspension according to Example 3. The paste obtained has a viscosity of approximately 100 poises at 25° C., and is applied to a chromium-plated sheet of metal in a layer thickness of around 0.8 mm. A cotton circular-knit fabric weighing 120 g. per sq. metre is placed on the layer while it is still moist and the composite material thus formed dried for 10 minutes at 100° C. Drying is followed by heating for 5 minutes at 170° C., after which the composite material is cooled with the sheet of metal to room temperature and then detached from the sheet. A porous composite material weighing 480 g. per square metre is obtained, being highly flexible and resistant to bending. The uniformly coloured material retains its suppleness even after storage for 4 weeks. Its permeability to water vapour as measurede in accordance with DIN 53 122 amounts to 500 g./m.$^2$/day for a moisture difference of 80% relative humidity and at a testing temperature of 25° C.

EXAMPLE 19

A brushable paste is prepared from a suspension according to Example 7 as described in Example 18, and coated on to a so-called separating paper by means of a rubber blanket coater in a coating machine. A polyethylene-coated paper of the kind used for the production of milk cartons is used for this purpose. The layer is dried for 5 minutes at 100° C. and then wound up. In a second operation, this layer is bonded to a textile using a conventional polyurethane-based solvent adhesive. A roll applicator is used for this purpose, and the adhesive applied to the porous film to be bonded in a quantity corresponding to a solids coverage of 20 g./m.$^2$, after which the porous film is combined with a knitted cotton fabric under a gentle roller pressure of 10 kp./m. (linear) and then dried. After the adhesive has hardened, the composite material is separated off from the substrate and then after-treated for 5 minutes at 170° C.

Some of the material is given a suitable finish with a coloured leather finishing agent, producing a leather-like surface finish which at the same time is coloured. The permeability of the porous layer to air and water vapour is prevented from being seriously influenced by applying the sealing layer by spraying in a quantity of less than 10 g./m.$^2$.

The coatings show the following properties when subjected to the tests normally used in the leather industry:

| | With finish damage | Without finish damage |
|---|---|---|
| Fastness to rubbing under heat according to SATRA. | None | Traces. |
| Ironing resistance at 150° C | Traces | Distinct. |
| Bending strength (dry) 200,000 bends | do | Traces. |
| Permeability to water vapour: | | |
| According to IUP | 3.7 | 8.5 mg./h.×cm.$^2$. |
| According to DIN 53 122 | 590 | 660 g./m.$^1$×day |

Fastness to rubbing at an elevated temperature was tested on a dry felt turned 300 times under a load of 2.5 kg. (the test specimen was not cooled in any way). To determine ironing resistance, the test specimen had a pressure of approximately 0.75 kp. applied to it over a rectangular edge at a temperature of 150° C. Bending strength was tested in a Bally Flexometer.

Both coatings were then dry cleaned five times in perchlorethylene. They did not show any changes either in their appearance or in their porosity, as measured from their permeability to water vapour.

EXAMPLE 20

1000 g. of a 40% suspension according to Example 9 were diluted with 30 g. of the thickener mentioned in Example 1 of polyurethane adduct and ethoxylated condensation product, stirred with 30 g. of water to form a brushable paste and then coated on to a metal plate in accordance with Example 16. The gap was set at 1.4 mm. A tear-free 0.6 mm. thick film was obtained after drying at 80° C. followed by heating for 5 minutes at 160° C. The permeability of the film to water vapour amounted to 650 g./m.$^2$/day as determined in accordance with DIN 53 122 for a humidity difference of 85% relative humidity and at a testing temperature of 25° C.

EXAMPLE 21

A 40% suspension according to Example 12 was processed into a porous film and then after-heated for 5 minutes at 160° C. as described in Example 20. The porous film had a tensile strength of 70 kp./cm.$^2$ and a breaking elongation of 420%. Under the conditions of Example 20, the 0.6 mm. thick film showed a permeability to water vapour of 400 g./m.$^2$/day.

EXAMPLE 22

Following the addition of 6 litres of water, 50 g. of the dispersion prepared in accordance with Example 7 (40%) are converted into sheet form in a Rapid-Kothen sheet former, and the sheet thus obtained dried for 5 minutes at 90° C. under a pressure of 1 kg./cm.$^2$. The elastic microporous film then has a tensile strength (DIN 53 504) of 36 kp./cm.$^2$ for a breaking elongation of 470% and a permeability to water vapour of 675 g./m.$^2$/day (DIN 53 122) for a thickness of 0.7 mm. After aging for 6 days at 70° C./95% relative humidity, the tensile strength rises to 83 kp./cm.$^2$ for a breaking elongation of 520%. The following figures are obtained by additional tempering for 3 minutes at 170° C.:

tensile strength: 47 kp./cm.$^2$
breaking elongation: 490%
permeability to water vapour: 600 g./m.$^2$/day After 6 days at 70° C./95% relative humidity:

tensile strength: 75 kp./cm.$^2$
breaking elongation: 540%

The films withstand 100,000 bends (Bally Flexometer) without suffering any damage.

EXAMPLE 23

A fleece was made up in a Fourdrinier long-wire laboratory papermaking machine (Kammere type) using the sedimenting dispersion (40%) prepared in accordance with Example 7. On leaving the paper-making machine, the fleece is leather-like in character. The following procedure was adopted.

2200 g. of the above dispersion were provided with 4 litres of water. 20 cc. of a 50% chlorobutadiene latex were then added with stirring and subsequently coagulated with 50 cc. of a 2% aqueous solution of a cationic polyamide/polyamine/epichlorhydrin product which is normally used for the wet-strength finishing of cellulose papers. 100 g. of a polyester short staple fibre (6 mm. 3.3 dtex) were then added to the suspension, followed by thorough mixing. 195 litres of water were then introduced in a V2A steel mixing tank, and the mixture processed in the aforementioned machine to form a fleece by the method normally used for manufacturing paper. The first drying cylinder was kept at 80° C. An approximately 0.8 mm. thick sheet structure is obtained which after tempering for 3 minutes at 140° C. shows a permeability to water vapour of 10.4 mg./h./cm.$^2$ (IUP) and a 6.6 mg./h./cm.$^2$ (IUP) at 160° C.

EXAMPLE 24

The procedure was as described in Example 23. 50 g. of a polyamide short staple fibre (6 mm. 2.7 dtex) were used instead of polyester short staple fibres. The sheet structure is similar to that of Example 23.

EXAMPLE 25

2200 g. of the sedimenting dispersion (40%) prepared in accordance with Example 7 were provided with 3.5 litres of water. 20 cc. of a 45% anionic butyl acrylate latex were then slowly added with stirring to this dispersion, followed by coagulation with 50 cc. of a 1% aqueous solution of a cationic condensation proudct of formaldehyde and aliphatic aminocarboxylic acids. 25 g. of bleached softwood sulphite cellulose in 500 cc. of water were then added to the suspension, followed by thorough mixing. Before the mixture was converted into a fleece by known methods in the laboratory paper-making machine mentioned in Example 23, it was provided with 192 litres of water in a V2A steel mixing tank. The fleece thus obtained has a permeability to water vapour of 3.6 mg./h./cm.² (IUP) after tempering for 3 minutes at 140° C. and 160° C.

EXAMPLE 26

The laboratory paper-making machine mentioned in Example 23 was provided with a steep wire (20° C.) and a secondary feed for the purposes of the following test. Whilst a fleece was prepared on the steep wire (by a known method) from polyester short staple fibres (15 mm., 3.3 dtex), the secondary feed was supplied with a suspension consisting of 2200 g. of the dispersion (40%) prepared in accordance with Example 7, 20 cc. of 50% anionic butadiene acrylonitrile latex which was coagulated with 50 cc. of a 2% aqueous solution of a cationic polyamide/polyamine/epichlorhydrin product.

The separately prepared fleeces delivered together to a couching roller produce a sheet structure which consists of a man-made fibre fleece as supported and a film lying on top of this support. The sheet structure is passed through the drying section of the laboratory paper-making machine as in Example 23.

What is claimed is:

1. A process for the production of aqueous suspensions or pastes of fibrous internally crosslinked particles which comprises reacting a polyurethane or polyurethane-urea prepolymer containing 0.01 percent to 1.5 percent by weight ionic groups with the proviso that not more than 0.2 percent quaternary ammonium nitrogen atoms are the ionic groups, NCO groups and from about 60% to about 90% by weight of 1,6-hexane diol polycarbonate units having the formula

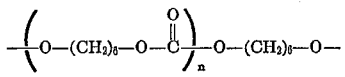

in which $n$ is an integer of from 5 to 20 with an aqueous solution of an organic polyamine containing at least three primary or secondary amino groups.

2. The process of claim 1 in which the prepolymer contains from 1 to 4% by weight of free NCO groups.

3. The process of claim 1 in which the prepolymer is dissolved in a solvent at a concentration of from 30 to 60% by weight, the resulting solvent solution is mixed with the aqueous solution of the polyamine at a temperature of from 20° C. to 60° C. to effect reaction after which the solvent is removed.

4. The process of claim 3 in which the ratio between the amine groups and the free NCO groups is from 0.2 to 1.5.

5. The process of claim 3 in which the polyamine is dispersed in water at a ratio by weight of water to prepolymer of between 0.8 and 3.

6. The product of the process of claim 1 in which the fibrous particles have a length more thtn 100 times greater than their transverse diameter and not more than 20% by weight of the solids content is particles having a ratio of longitudinal diameter to transverse diameter of less than 2 or a length of less than 10μ.

References Cited

UNITED STATES PATENTS

| | | | |
|---|---|---|---|
| 3,419,533 | 12/1968 | Dieterich et al. | 260—29.2 TN |
| 3,491,050 | 1/1970 | Keberle et al. | 260—29.2 TN |
| 2,999,844 | 9/1961 | Muller et al. | 260—77.5 D |
| 3,110,686 | 11/1963 | Newton | 260—77.5 D |
| 3,450,793 | 6/1969 | Schnell et al. | 260—77.5 D |
| 3,541,183 | 11/1970 | Kallert et al. | 260—77.5 D |
| 2,999,788 | 9/1961 | Morgan | 28—Dig. .001 |
| 3,080,272 | 3/1963 | Jackson | 161—168 |

FOREIGN PATENTS

| | | | |
|---|---|---|---|
| 1,076,688 | 7/1967 | Great Britain | 260—29.2 TN |

JOHN C. BLEUTGE, Primary Examiner

A. H. KOECKERT, Assistant Examiner

U.S. Cl. X.R.

161—168; 162—157 R; 260—77.5 D, 77.5 AM, AQ, Q; 264—5